US010302792B2

(12) United States Patent
Patterson et al.

(10) Patent No.: US 10,302,792 B2
(45) Date of Patent: May 28, 2019

(54) DETECTION OF HIGH INCIDENT REFLECTIVE BOUNDARIES USING NEAR-FIELD SHEAR WAVES

(71) Applicant: BAKER HUGHES INCORPORATED, Houston, TX (US)

(72) Inventors: Douglas J. Patterson, Spring, TX (US); Eduardo A. Cazeneuve, Spring, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 204 days.

(21) Appl. No.: 15/178,290

(22) Filed: Jun. 9, 2016

(65) Prior Publication Data

US 2016/0363684 A1    Dec. 15, 2016

Related U.S. Application Data

(60) Provisional application No. 62/173,873, filed on Jun. 10, 2015.

(51) Int. Cl.
*G01V 1/50* (2006.01)
*E21B 47/022* (2012.01)
(Continued)

(52) U.S. Cl.
CPC .......... *G01V 1/50* (2013.01); *E21B 47/02208* (2013.01); *E21B 47/04* (2013.01);
(Continued)

(58) Field of Classification Search
CPC ............... E21B 47/02; E21B 47/02208; E21B 47/02216; E21B 47/02224; E21B 49/00; E21B 49/005; E21B 49/006
See application file for complete search history.

(56) References Cited

U.S. PATENT DOCUMENTS 3,764,968 A   10/1973 Anderson
3,958,217 A    5/1976 Spinnler
(Continued)

FOREIGN PATENT DOCUMENTS

WO    2015061305 A1    4/2015

OTHER PUBLICATIONS

Unconventional Reservoir Fracture Evaluation Utilizing Deep Shear-Wave Imaging by Doug Patterson et al. (Year: 2011).*
(Continued)

*Primary Examiner* — Brad Harcourt
*Assistant Examiner* — David Carroll
(74) *Attorney, Agent, or Firm* — Mossman, Kumar & Tyler, P.C.

(57) ABSTRACT

Systems, devices and methods for evaluating an earth formation intersected by a borehole. Method include detecting a reflective boundary in the earth formation by: generating a multipole acoustic signal with a logging tool in the borehole; identifying a shear wave signal resulting from shear body waves reflected in the formation in a near-field region of the formation around the borehole responsive to the generated multipole acoustic signal; and estimating at least a depth along the borehole of the boundary based on the shear wave signal. The boundary may have an angle of incidence with respect to the borehole of greater than 70 degrees. The boundary may be at least one of i) a fracture; and ii) a fault. The method may include evaluating the boundary using at least one attribute of the shear wave signal and the estimated depth.

19 Claims, 5 Drawing Sheets

(51) Int. Cl.
*E21B 47/04* (2012.01)
*G01V 1/28* (2006.01)
*G01V 1/46* (2006.01)

(52) U.S. Cl.
CPC ............... *G01V 1/284* (2013.01); *G01V 1/46* (2013.01); *G01V 2210/642* (2013.01)

(56) References Cited

U.S. PATENT DOCUMENTS

| | | | |
|---|---|---|---|
| 4,351,037 | A | 9/1982 | Scherbatskoy |
| 4,953,595 | A | 9/1990 | Kotlyar |
| 5,402,392 | A * | 3/1995 | Lu ........................... G01V 1/46 166/254.2 |
| 6,614,360 | B1 * | 9/2003 | Leggett, III ............ E21B 44/00 340/853.1 |
| 6,898,150 | B2 | 5/2005 | Hahn et al. |
| 7,035,165 | B2 | 4/2006 | Tang |
| 7,417,920 | B2 | 8/2008 | Hahn et al. |
| 8,055,448 | B2 | 11/2011 | Mathiszik et al. |
| 2008/0151690 | A1 | 6/2008 | Tang et al. |
| 2009/0205899 | A1 | 8/2009 | Geerits et al. |
| 2014/0290936 | A1 * | 10/2014 | Wills ...................... E21B 43/26 166/250.1 |
| 2015/0013974 | A1 * | 1/2015 | Mekic .................. E21B 47/101 166/254.1 |
| 2015/0109886 | A1 | 4/2015 | Mekic et al. |

OTHER PUBLICATIONS

F. O'Gorman et al, "Finding Picture Edges Through Collinearity of Feature Points," Proceedings of the 3rd Int'l Joint Conference on Artificial Intelligence, pp. 543-555 (1973).

M. Cohen et al., "On the Detection of Structures in Noisy Picturesw," School of Computer Science, McGill University (1977).

J. Canny, "A Computational Approach to Edge Detection," IEEE Trans. Pattern Anal. Mach. Intell, pp. 679-698 (1986).

Irwin Sobel, et al., "A 3×3 Isotropic Gradient Operator for Image Processing," (1986).

D.A. Forsyth, et al., "Computer Vision: A Modern Approach," Prentice Hall Professional Technical Reference, p. 217 (2002).

Christopher M. Bishop, "Pattern Recognition an Machine Learning," Part 1, pp. 1-25, Springer-Verlag, NY, NY (2006).

Christopher M. Bishop, "Pattern Recognition an Machine Learning," Part 2, pp. 26-50, Springer-Verlag, NY, NY (2006).

Christopher M. Bishop, "Pattern Recognition an Machine Learning," Part 3, pp. 51-75, Springer-Verlag, NY, NY (2006).

Christopher M. Bishop, "Pattern Recognition an Machine Learning," Part 4, pp. 76-100, Springer-Verlag, NY, NY (2006).

Christopher M. Bishop, "Pattern Recognition an Machine Learning," Part 5, pp. 101-125, Springer-Verlag, NY, NY (2006).

Saket Bhardwaj et al., "A Survey on Various Edge Detector Techniques," Procedia Technology, pp. 220-226 (2011).

Suxia Cui et al., "Image Processing Techniques in Shockware Detection and Modeling," Jnl of Signal and Info Processing, vol. 4, pp. 109-113 (2013).

Int'l Search Report and Written Opinion in PCT/US2016/036842, dated Sep. 22, 2016.

Christopher M. Bishop, "Pattern Recognition an Machine Learning," Parts 1-7, pp. Preface-136, Springer-Verlag, NY, NY (2006).

D. Salomon et al, "Handbook of Data Compression," Springer Science & Business Media (Introduction only) (2010).

* cited by examiner

DETECTION OF HIGH INCIDENT REFLECTIVE BOUNDARIES USING NEAR-FIELD SHEAR WAVES

CROSS REFERENCE TO RELATED APPLICATIONS

This application claims priority from the U.S. Provisional Patent Application Ser. No. 62/173,873 filed Jun. 10, 2015, which application is incorporated herein by reference in its entirety.

FIELD OF THE DISCLOSURE

In one aspect, this disclosure relates generally to the field of acoustic well logging. More specifically, the present disclosure is related to methods of processing receiver signals from an acoustic well logging instrument to detect high incident reflective boundaries such as fractures.

BACKGROUND OF THE DISCLOSURE

Geologic formations are used for many purposes such as hydrocarbon production, geothermal production and carbon dioxide sequestration. Boreholes are typically drilled into the earth in order to intersect and access the formations. Hydraulic fracturing and other stimulation techniques may be applied to the formation to facilitate removal of hydrocarbons by fracturing the formation and/or extending existing fractures in the formation. Evaluation of the extent, complexity, and orientation of fractures is relevant to evaluating hydraulic fracturing operations, monitoring the fracture system, and managing operations in the formation.

SUMMARY OF THE DISCLOSURE

In aspects, the present disclosure is related to methods of evaluating an earth formation intersected by a borehole. The borehole may be cased or open. Methods may include detecting a reflective boundary in the earth formation by: generating a multipole acoustic signal with a logging tool in the borehole; identifying a shear wave signal resulting from shear body waves reflected in the formation in a near-field region of the formation around the borehole responsive to the generated multipole acoustic signal; and estimating at least a depth along the borehole of the boundary based on the shear wave signal. The near-field region may be substantially defined by a region from which flexural waves can be reflected and detected. The boundary may have an angle of incidence with respect to the borehole of greater than 70 degrees. The boundary may be at least one of i) a fracture; and ii) a fault. The method may include evaluating the boundary using at least one attribute of the shear wave signal and the estimated depth. The logging tool may be conveyed on a drill string, and the method may include detecting the reflective boundary during drilling operations, and controlling the direction of drilling based on the estimated depth of the boundary. The method may include performing further operations in the formation or generating a formation fracture model based on the estimated depth of the boundary.

The method may include any or all of estimating at least one property of the boundary using an attribute of the shear wave signal; estimating at least one property of the boundary using another signal resulting from at least one of i) a compressional wave; ii) a Stoneley wave; and iii) a guided wave; estimating at least one property by comparing the another signal with the signal; using additional data and the depth to estimate a location and an orientation of the boundary; estimating a strike azimuth of the boundary using the depth and additional information; and estimating at least one further property of the boundary using the estimated strike azimuth of the boundary, wherein the at least one further property comprises at least one of: i) a geomechanical property, and ii) a lithological property.

Another general method embodiment may include evaluating an earth formation by performing initial monitoring of the earth formation for reflective boundaries using method embodiments as described above; after the initial monitoring, performing a hydraulic fracturing operation in the borehole; and, after performing the hydraulic fracturing operation in the borehole, performing additional monitoring of the earth formation for reflective boundaries using method embodiments as described above; and evaluating the hydraulic fracturing operation in dependence upon differences between results of the initial monitoring and results of the additional monitoring.

Embodiments according to the present disclosure may include apparatus for evaluating an earth formation intersected by a borehole, comprising: an acoustic tool configured for conveyance in the borehole on a carrier, the acoustic tool including a multipole acoustic transmitter and a multipole acoustic receiver; and at least one processor configured to detect a reflective boundary in the earth formation by: generating a multipole acoustic signal with the logging tool in the borehole; identifying a shear wave signal received by the acoustic receiver resulting from shear body waves reflected in the formation in a near-field region of the formation around the borehole responsive to the generated multipole acoustic signal; and estimating at least a depth along the borehole of the boundary based on the shear wave signal.

Embodiments according to the present disclosure may include apparatus for evaluating an earth formation intersected by a borehole, comprising: a processor; a non-transitory computer-readable medium; and a program stored by the non-transitory computer-readable medium comprising instructions that, when executed, cause the processor to perform a method as described herein.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Aspects of the present disclosure relate to evaluating an earth formation intersected by a borehole by detecting a reflective boundary in the formation. Example boundaries may include fractures, faults, and other features of the formation.

Aspects of the present disclosure are applicable in the detection and imaging of boundaries at high incident angles with respect to the wellbore (also referred to herein as a 'borehole'). This may occur in deviated wellbores, particularly highly deviated wellbores (including horizontal wellbores). In a highly deviated wellbore, changes in lithology tend to be gradual, so any rapid changes of shear impedance are most probably due to fractures (or, in the case of a fault, with an abrupt lithology change). In horizontal well drilling, it may be advantageous to drill the borehole in an azimuth normal to the natural fracture network in order to intersect as many fractures as possible to help optimize production. Detection of fractures facilitates formation modeling and enables better optimization of stimulation operations. Detection of boundaries may be useful in geosteering, formation evaluation, production planning, and the like.

Recently, techniques have been developed to use shear body waves to image fractures and features outside of the near borehole region (e.g., Deep Shear Wave Imaging). A "body wave" as used herein, refers to a wave that propagates through a medium rather than along an interface. These shear body waves may be created by a multipole acoustic tool, and are extremely useful in far-field imaging.

However, the measured signal from a reflected far-field body wave is severely affected by the angle of incidence. Highly deviated boreholes result in imaging points which collapse around the borehole, limiting resolution. Thus, it is generally understood that the angle of incidence between the borehole and the feature is required to be in the range between 0 to 60 degrees to achieve resolution sufficient to conduct imaging as described above.

General embodiments of the present disclosure include methods, devices, and systems for detecting a reflective boundary, such as, for example, a fracture, using near-field shear waves. General method embodiments may include detecting a reflective boundary by generating a multipole acoustic signal with a logging tool in the borehole; identifying a shear wave signal resulting from shear body waves reflected in the formation in a near-field region of the formation around the borehole responsive to the generated multipole acoustic signal; and estimating the location of a boundary (e.g., a depth along the borehole) based on the shear wave signal.

Figure 1A:
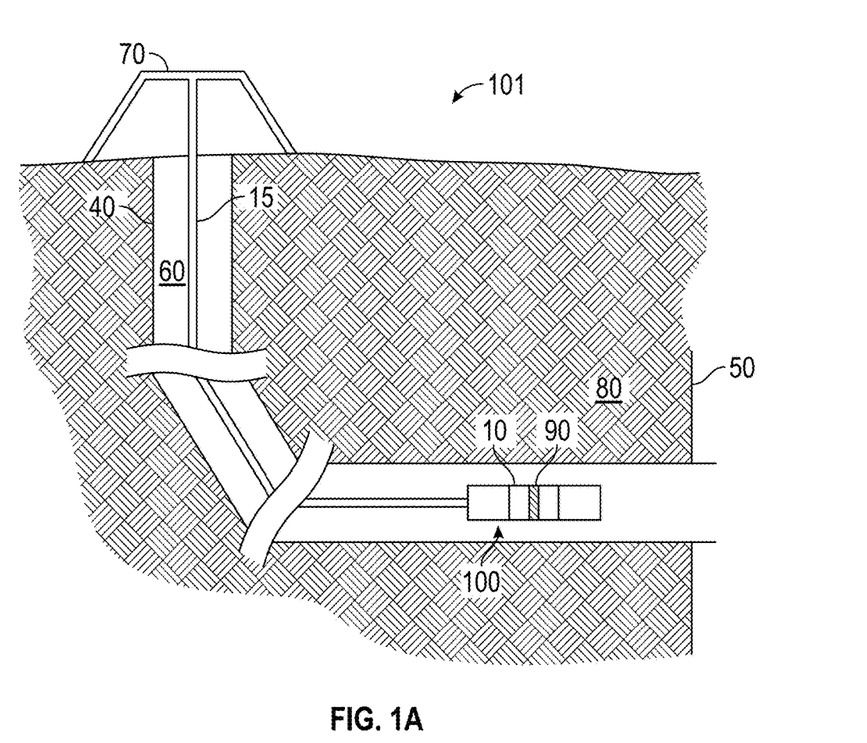
FIG. 1A illustrates an example logging system for detecting an acoustically reflective boundary in an earth formation in accordance with embodiments of the disclosure.

FIG. 1A illustrates an example logging system for detecting an acoustically reflective boundary in an earth formation in accordance with embodiments of the disclosure. The reflective boundaries may be, for example, faults or fractures. The fractures may be natural fractures, fractures stimulated by stimulation activities (e.g., hydraulic fracturing), or a combination. Figures are not drawn to scale.

FIG. 1A illustrates a tool 10 conveyed in a borehole intersecting a formation 80 on tool string 100. The borehole 40 may be filled with a downhole fluid 60. The borehole 40 may be cased or open. The tool 10 may contain a sensor assembly 90, including one or more sensors for detecting the reflective boundary such as, for example, one or more acoustic transmitters and receivers. These sensors may include at least one multipole acoustic transmitter and at least one acoustic receiver. The tool 10 may be configured to transmit an acoustic signal into the borehole using the acoustic transmitter, and receive acoustic signals including shear wave signals generated from shear body waves reflected in the formation in a near-field region of the formation around the borehole using the receiver. The shear body waves are reflected from the high-incidence reflective boundary (e.g., fault) 50.

One or more of the sensors may be configured for evaluation of the borehole or the formation according to known techniques, for taking measurements indicative of drilling parameters, borehole properties, formation properties, telemetry or for other parameters of interest. Sensor assembly 90 may be contained in a single tool or distributed about the tool string, the surface, or at other locations in the borehole or the formation.

The system 101 may include a conventional derrick 70. A conveyance device ("carrier") 15, which may be rigid or non-rigid, may be configured to convey the downhole tool 10 into wellbore 40 in proximity to formation 80. The conveyance device 15 may be a drill string, coiled tubing, a slickline, an e-line, a wireline, etc. The conveyance device 15 may be a stimulation string.

Downhole tool 10 may be coupled or combined with additional tools. Thus, depending on the configuration, the tool 10 may be used during drilling and/or after the wellbore (borehole) 40 has been formed, and may be used in a cased borehole before and/or after fracturing operations (e.g., fracking, refracking) in an interval of the borehole. While a land system is shown, the teachings of the present disclosure may also be utilized in offshore or subsea applications. The conveyance device 15 may include embedded conductors for power and/or data for providing signal and/or power communication between the surface and downhole equipment. The conveyance device 15 may include a bottom hole assembly, which may include a drilling motor for rotating a drill bit to extend (drill) the borehole, and a system for circulating a suitable drilling fluid (also referred to as the "mud") under pressure. During drilling operations, rotation of the drill bit disintegrates the formation at the distal end of the drill string. Delay may limit the value of information gained from the sensors, because, among other things, modification of drilling operations or the mud program is not timely with respect to the information extracted. Control of these devices, and of the various processes of the drilling system generally, may be carried out in a completely automated fashion or through interaction with personnel via notifications, graphical representations, user interfaces and the like. Reference information accessible to the processor may also be used.

In particular implementations, the system 101 may be configured as a hydraulic stimulation system. As described herein, "stimulation" may include any injection of a fluid into a formation. An exemplary stimulation system may be configured as a cased or open-hole system for initiating fractures and/or stimulating existing fractures in the formation. In some aspects, the tool 10 is conveyed in the formation 80 via a cased borehole both prior to and after a fracturing operation to evaluate the fracturing operation.

Figure 1B:
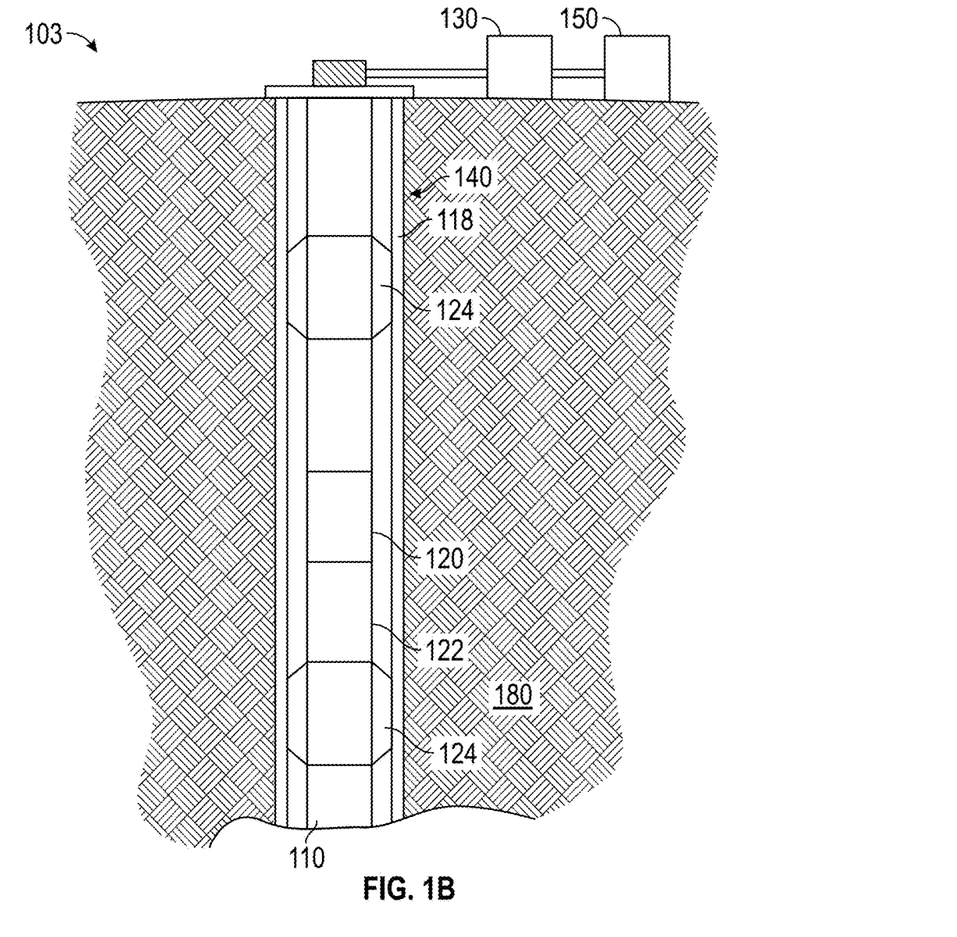
FIG. 1B illustrates a stimulation system in accordance with embodiments of the present disclosure.

FIG. 1B illustrates a stimulation system in accordance with embodiments of the present disclosure. The system 103 includes a downhole tool string 110, such as a stimulation string, wireline, or other carrier conveyed in a borehole 140 surrounded by casing 118. In one embodiment, the system 103 is configured as a hydraulic stimulation system, but may also configured for additional functions such as hydrocarbon production, evaluation of the formation, evaluation of the borehole, and so on. As described herein, "stimulation" may include any injection of a fluid into a formation. An exemplary stimulation system may be configured as a cased or open hole system for initiating fractures and/or stimulating existing fractures in the formation. A fluid may be any flowable substance.

The tool string 110 may include one or more tools or components to facilitate stimulation of the formation 180. For example, the tool string 110 may include a fracturing assembly 120 including, e.g., injection nozzles and mechanical valve devices (e.g., fracturing sleeves, drop-ball devices, and so on). The tool string 110 may include a perforation assembly 122. The tool string 110 may include additional components, such as one or more isolation components 124 (e.g., packer subs, frangible barriers, etc.). Subs may include one or more processors or associated electronics configured to communicate with a surface processing unit and/or control the respective component or assembly.

The system 103 may be a hydraulic fracturing system that includes an injection device 130 (e.g., a high pressure pump 130) in fluid communication with a fluid source 150. The injection device 130 injects fluid into the string 110 to introduce fluid into the formation 180. Measurement and control devices, including one or more sensors responsive to pumping parameters, may be included for monitoring and control of the respective operation (e.g., hydraulic fracturing or other stimulation).

Systems 101 and 103 as described in FIGS. 1A & 1B may include a hardware environment operationally coupled (via wired or wireless communication) with the downhole tool 10, other components of the tool string 10, 110, and/or distributed sensors. This hardware environment may enable controlling and acquiring information from system components. The term "information" as used herein includes any form of information (acoustic, analog, digital, EM, printed, etc.), and may include one or more of: raw data, processed data, and signals.

Figure 2:
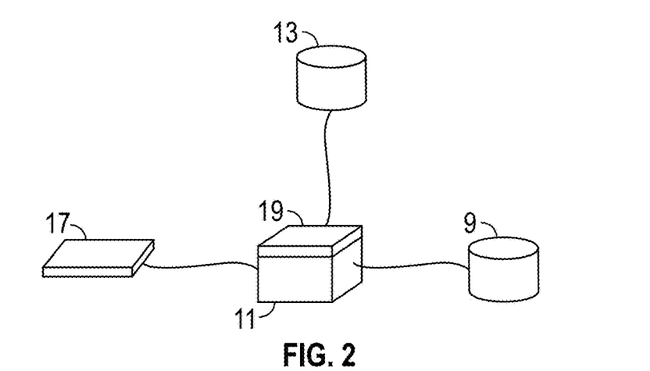
FIG. 2 illustrates a hardware environment in accordance with embodiments of the present disclosure.

Referring to FIG. 2, some embodiments of the present disclosure may be implemented with a hardware environment that includes an information processor 11, an information storage medium 13, an input device 17, processor memory 19, and may include peripheral information storage medium 9. The hardware environment may be in the well (e.g., a downhole controller), at the rig (e.g., a surface controller), or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program including machine-readable computer program instructions that when executed cause information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve sensor information from either information storage medium 13 or peripheral information storage medium 9 and process the information to estimate a parameter of interest. Information processor 11 may be located on the surface or downhole.

A surface control unit or processor(s), as described with respect to FIG. 2 may receive signals from downhole sensors and devices and signals from sensors used in the system and process such signals according to programmed instructions provided to the surface control unit. The environment may include a control unit in operable communication with pump 130 and various sensors. The control unit may be configured to receive, store and/or transmit information generated from the sensors and/or the pump, and control operational parameters responsive to the information.

The sensors of sensor array 90 may be configured to acquire information relating boundary detection and to the downhole feature(s) of interest. The sensors may be in signal communication with a processor via a suitable communication line. It should be understood that the type of sensors used on tool may depend in part on the downhole features to be investigated.

General embodiments of the present disclosure include methods, devices, and systems for acquiring information relating to the boundary 50. One or more of the processors of the system 101 may be configured to estimate properties of the formation 80, such as, for example, location and other characteristics of the boundaries (e.g., fracture 50) such as, for example, fracture orientation, fracture size, fracture intensity, fracture transmissivity, or fracture aperture, using information acquired through sensor array 90.

The sensors of sensor array 90 may include acoustic, pulsed-neutron, resistivity, radiation, survey, seismic, and imaging sensors. Methods disclosed herein may also include using estimated characteristics of the detected boundaries in performing further operations in the borehole (e.g., drilling, reaming, etc.). System 101 may contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 80.

In drilling embodiments, system 101 may further include a variety of other sensors, circuitry and processing software and algorithms for providing information about the BHA, drill string, the drill bit and downhole equipment and for determining one or more properties of a bottom hole assembly ("BHA") (such as vibration, bending moment, acceleration, oscillations, whirl, stick-slip, etc.) and drilling operating parameters (such as weight-on-bit, fluid flow rate, pressure, temperature, rate of penetration, azimuth, tool face, drill bit rotation, etc.). Such sensors are generally known in the art. In such embodiments, the BHA may also include a steering apparatus or tool for steering the drill bit along a desired drilling path, such as force application members activated using electro-mechanical, electro-hydraulic or mud-hydraulic actuators, a bent sub, and the like.

A point of novelty of the systems illustrated in FIGS. 1A-2 is that at least one processor associated with the systems is configured to perform certain methods (discussed below) that are not in the prior art.

One or more of the processors of system 101 and 103 may be configured to control sensors as described above and carry out the method of evaluating the earth formation as described in further detail below. Evaluating the formation may include processing the information using at least one processor to detect the boundary 50, including, for example, estimating a location of the boundary 50 (e.g., borehole depth, actual coordinates, orientation, and so on).

In some general embodiments, at least one processor of the system (e.g., one or more of any of a surface processor, downhole processor, or remote processor) may be configured to use an acoustic monopole and/or multipole (e.g., dipole) transmitters to emit acoustic energy pulses that typically travel radially outwardly from the transmitters and to use at least one acoustic receiver to produce a corresponding signal, responsive to a reflection of an emitted wave. One of the processors may also be configured to evaluate the formation from the information corresponding to this signal. In operation, a portion of waves generated by the transmitter reflects from features in the formation causing a response at the receiver. Thus, each receiver produces a response indicative of the formation.

For dipole configurations, a processor of the tool directs one or more dipole sources to transmit energy into the borehole and the formation. For example, the dipole source may transmit in a direction "x" extending away from the borehole, which is typically perpendicular or substantially perpendicular to the longitudinal axis of the borehole and the tool (the "z" direction). Flexural waves are generated that typically can reflect and provide readings out to around 2-4 feet radially into the formation. Body waves, which can be reflected back to the borehole, may be detected as signals that are late-arriving and faint relative to reflected flexural wave signals. The region around the borehole can be divided into a near-field region that extends laterally (e.g., perpendicular to the borehole axis) to a first distance from the borehole, and a far-field region that extends laterally from the first distance to a second distance. The near-field region, as defined herein, may mean from the borehole to the furthest distance that flexural waves can extend and return detectable reflected signals.

Sensor array 90 may include a dipole source that generates two different types of shear body waves in the formation: a vertical shear wave (SV) aligned with the dipole source and polarized in the "x" direction, and a horizontal shear wave (SH) polarized in the "y" direction. The dipole source may operate at a frequency of 2-3 kHz. Energy reflected back from these waves can provide information for fractures that, in one embodiment, are oriented such that the angle between the reflecting fracture and the borehole axis (e.g., the z-axis) is greater than 70 degrees.

The high-incidence processing technique of the present disclosure may use information generated from cross-dipole source. The source generates shear body waves that radiate into the formation and are reflected by fractures in the formation. The processing technique has a direct wave mode that must be suppressed.

As described above, it is well known that imaging shear body waves using Deep Shear Wave Imaging ('DWSI') is technically infeasible at high-incidence angles. Sufficient resolution for deep imaging is not possible outside the 0 to 60 degree angle range, because imaging points collapse around the borehole as the incidence angle approaches the upper limit. As shown below, however, shear waves may be used to detect boundaries at a region closer to the borehole (e.g., in the near-field).

Figure 3:
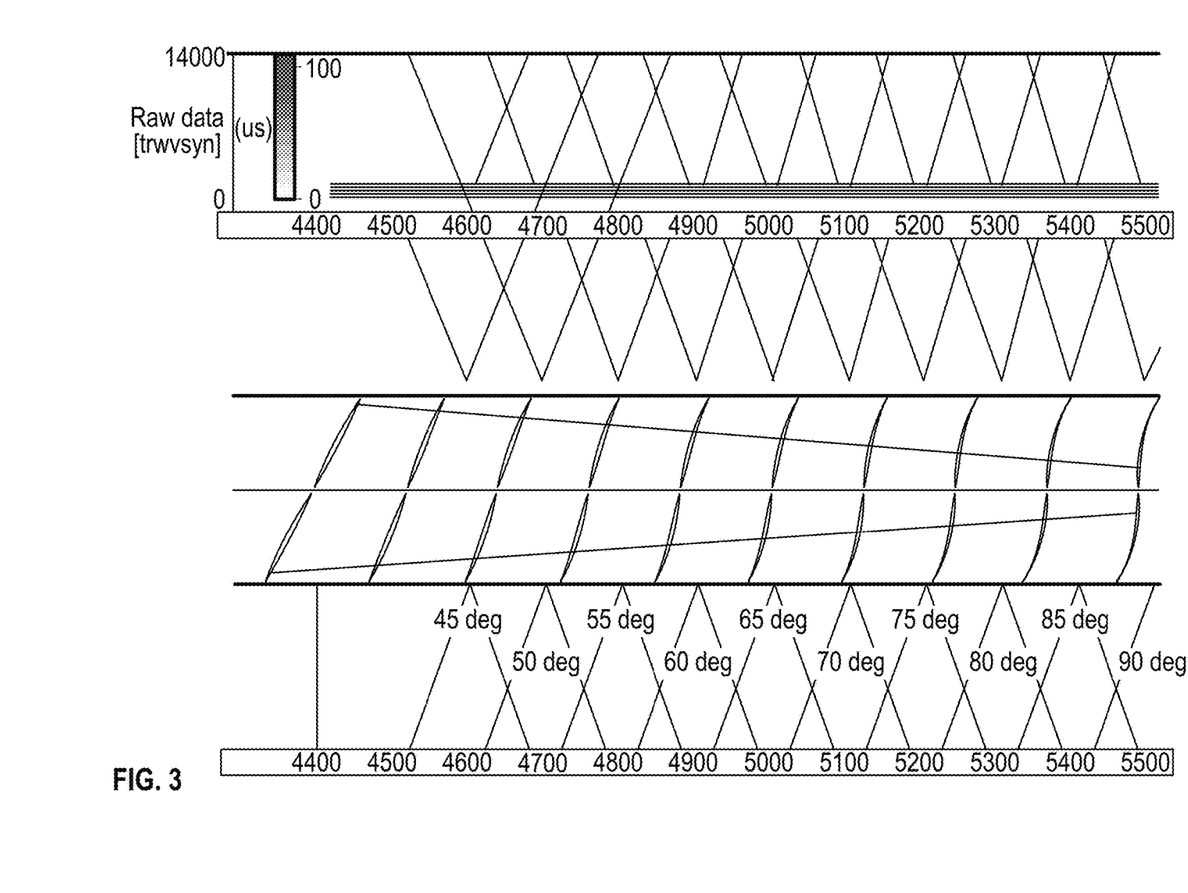
FIG. 3 shows the results of simulated near-field shear wave logging measurements at various angles of incidence.

FIG. 3 shows the results of simulated near-field shear wave logging measurements at various angles of incidence. FIG. 3 illustrates that even at 90 degrees, shear waves reflecting from boundaries in the near field are readily detected at a significant distance along the borehole, although the range away from the borehole where they can be imaged decreases with increase in incidence angle, and in some instances provide sufficient clarity to image the near-borehole segment of the boundary. As illustrated, FIG. 3 demonstrates decreasing far-field sensitivity as the angle of incidence increases (e.g., the cone of sensitivity).

Energy reflected back from these waves can provide sufficient information for fracture high-incidence fracture detection, either alone or in conjunction with traditional far-field waves. As will be apparent to one of skill in the art, the information contained in the received near-field signal (e.g., in terms of resolution) for detection and imaging decreases with the decrease in angle. However, as noted above, the information contained in the received far-field waves corresponding with traditional DSWI increased with decrease in angle incidence, such that any deficiencies in the near-field attributable signal may be compensated by using far-field information.

Multiple images can be used in combination to determine the presence of natural and hydraulically induced fractures. Monitoring of these fractures can advantageously be used to monitor a reservoir associated with the formation, as well as fracturing effectiveness.

Measurements may be used to estimate anisotropy and azimuth, which can be used to estimate the location, intensity and strike (azimuth) of natural and/or stimulated fractures. Such information is useful in determining fracture height, length and extent in a formation. For example, in evaluating the results of stimulation operations, shear wave processing can be used to estimate hydraulic fracture height (HFH) and length (HFL), and/or the lateral extent of fractures into the far-field or Stimulated Reservoir Area (SRA).

The processing techniques above can be used in conjunction with other techniques for fracture evaluation, such as ultrasonic imaging, Stoneley permeability analysis, and azimuthal shear-wave anisotropy evaluation from cross-dipole, that typically investigate a limited area around a well, e.g., 2-4 ft.

Figure 4:
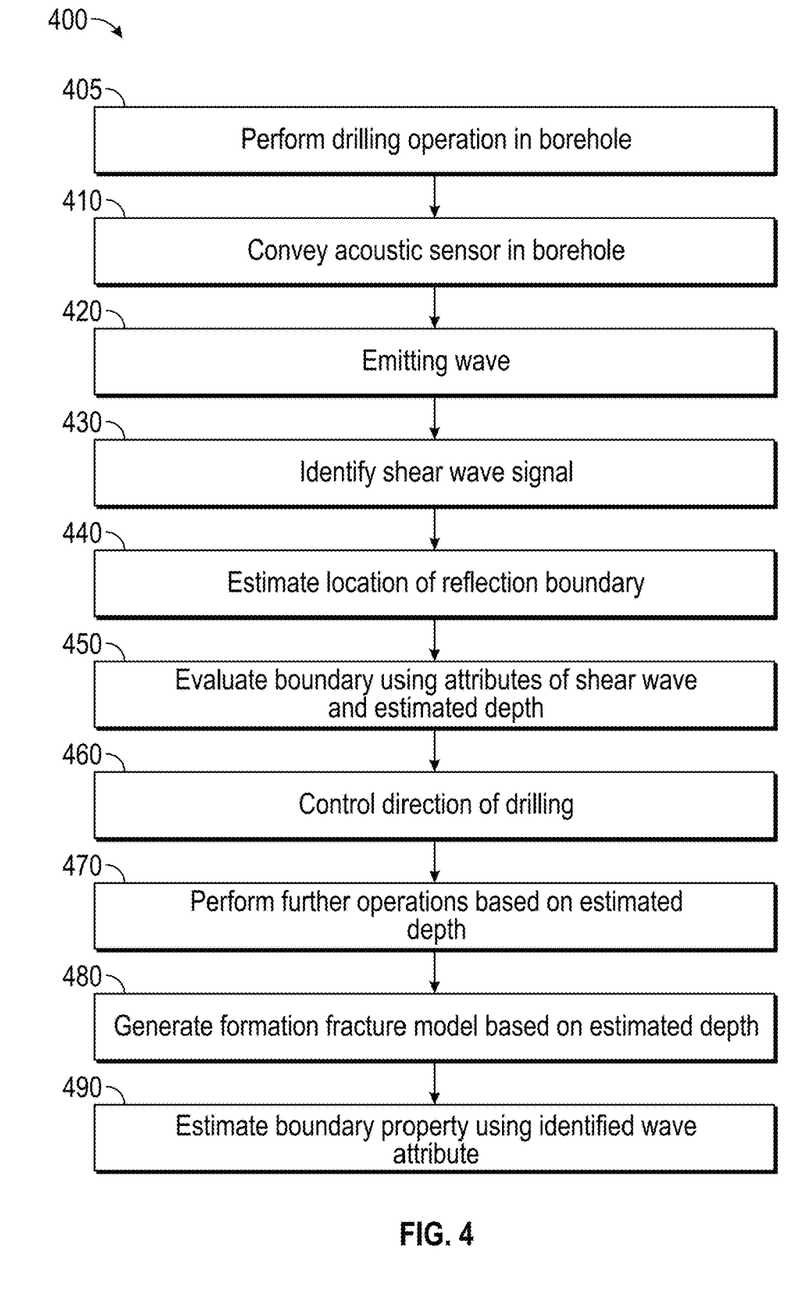
FIG. 4 illustrates a method for evaluating an earth formation in accordance with embodiments of the present disclosure.

FIG. 4 illustrates a method for evaluating an earth formation. The method 400 is described in conjunction with a processor that receives information (e.g., signal data) relating to an earth formation with fractures or other reflective boundaries. Optional step 405 of the method 500 may include performing a drilling operation in a borehole. For example, a drill string may be used to form (e.g., drill) the borehole. Optional step 410 may include conveying at least one acoustic sensor in the borehole on a conveyance device.

Optional step 420 of the method 400 may include emitting a wave. In some embodiments, step 420 may include emitting a multipole acoustic wave. Step 430 is identifying a shear wave signal. Acoustic signals may be measured via hydrophone (i.e., as a pressure pulse). Step 430 of the method 400 may include using at least one sensor to produce information responsive to a shear body waves reflected in the formation in a near-field region of the formation around the borehole, wherein the information is indicative of a reflective boundary along the borehole. Step 430 may be carried out using processing techniques common in the art such as identifying signal characteristics indicative of the shear body wave, using moveout velocity, and the like.

Step 440 may include processing the information using at least one processor to estimate a location of the reflective boundary. Step 440 may include estimating a depth along the borehole of the boundary based on the shear wave signal. Optional step 450 may include evaluating the boundary using at least one attribute of the shear wave signal and the estimated depth.

Optional step 460 may include controlling the direction of drilling based on the estimated depth of the boundary. Optional step 470 may include performing further operations in the formation based on the estimated depth of the boundary. For example, further operations may include producing hydrocarbons, performing well stimulation, casing the borehole, and so on.

Optional step 480 may include generating a formation fracture model based on the estimated depth of the boundary. Optional step 490 may include estimating at least one property of the boundary using an attribute of an identified wave received by the receiver. The wave attribute may be an attribute of the shear wave signal. Alternatively or additionally, attributes of wave signals resulting from at least one of i) a compressional wave; ii) a Stoneley wave; and iii) a guided wave. The attribute may include one of amplitude, frequency, duration, decay, and so on. In some embodiments, attributes of the shear wave signal may be compared against the same attributes of one of the other identified signals.

Figure 5:
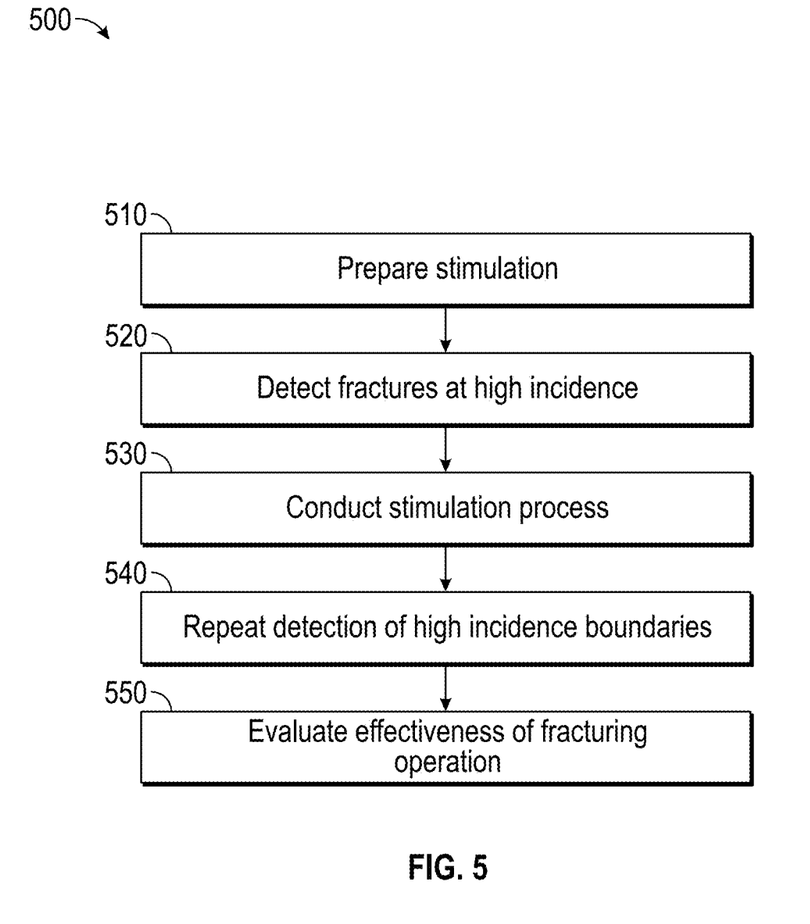
FIG. 5 illustrates a method for evaluating fractures in an earth formation in accordance with embodiments of the present disclosure.

FIG. 5 illustrates a method for evaluating fractures in an earth formation. The method 500 is described in conjunction with a processor that receives information (e.g., signal data) relating a fracturing operation. Optional step 510 may include preparation for stimulation. Step 510 may be carried out by selecting one or more zones of the borehole for stimulation, e.g., using various open hole logging operations. This may include, after identifying zones of interest, running casing into the borehole and cementing.

Optional step 520 of method 500 may include detecting natural fractures in the formation at high incidence to the borehole prior to stimulation by generating acoustic signals from a multipole source, e.g., a dipole source. In one embodiment, detection of the natural fractures is performed through a cased hole. In another embodiment, detection is performed through an open hole, which may then be cased prior to the stimulation operation.

In some implementations, detection of high incidence fractures is performed as a logging tool is run through the cased hole. Detection of the high-incidence reflector may be performed in the near-field in conjunction with another imaging technique, such as, for example, DSWI used for the far-field. In addition to detections, DSW information may be used to estimate the azimuth of the strike orientation of natural and hydraulic fractures in the far-field from the wellbore. The amount of anisotropy (variation in a given direction) detected by the DSW imaging gives a measure of fracture intensity, and the azimuth gives the fracture strike direction.

Step 530 of method 500 may include conducting a stimulation operation in the formation. This may be carried out, for example, by using the system 103 to perforate the borehole and pump fluid into the borehole to hydraulically fracture the formation. Step 540 of method 500 repeats detection of high-incidence boundaries after the hydraulic fracturing operation is complete. Optional step 550 may include evaluating the effectiveness of the fracturing operation and/or evaluate the formation, e.g., by modeling the formation or improving existing models. Post-fracture detection results may be compared with the pre-fracture detection results, for example. In addition, post-fracture imaging results may be compared with the pre-fracture imaging results. At least one of the post-fracture detection and post-fracture imaging is used to calculate the hydraulic fracture height (HFH) and length (HFL) and Stimulated Rock Area (SRA).

By combining the high-incidence fracture shear wave identification results with results from Deep Shear Wave Imaging (or other far-field imaging technique), the location, orientation and magnitude of fractures in the formation can be evaluated in both the far-field and near-field around the borehole. Additional measurements of reflected guided waves, compression waves, and Stoneley waves may also be used in combination with these measurements to provide a more complete picture of the fracture intensity and complexity before and after fracturing, and thus provides a more complete evaluation of the effectiveness of the fracturing operation. The measurements may be used to generate or improve a model of the formation and/or fractures, such as a discrete fracture network (DFN) model, geological model or other mathematical model of the formation. For example, images taken before and after the fracturing operation are used to re-evaluate geomechanical properties of the formation and/or create new models.

In another embodiment, the strike orientation and azimuth estimated from the pre-fracturing and/or post-fracturing measurements are evaluated to estimate the number and extent of natural fractures and/or stimulated fractures. This information may be used to evaluate the effectiveness of the fracturing operation and/or make adjustments to subsequent fracturing operations.

Shear wave boundary detection pre-and-post fracture results may be used in Fracture Stimulation Modeling and Design as part of the planning phase for wellbore completions. Such planning includes predicting hydraulic fracture height as well as fracture length and/or stimulated reservoir area away from the borehole.

Existing software typically uses models based on homogenous formations, but can apply heterogeneous model assumptions. Shear wave high-incidence boundary detection, in conjunction with DSWI, may be able to provide three critical parameters for a fracture model (HFH, HFL and SRA) that are the true response of the formation. This process removes at least some uncertainty caused by mathematical modeling assumptions and dramatically improves hydraulic fracturing stimulation solutions.

Aspects of the present disclosure may be implemented using techniques known in the art an adapted to use with near-field shear wave signals or with mixed near- and far-field signals. To that end, previous applications US 2015/0013974 to Mekic et al, US 2015/00109886 to Mekic et al, and US 2008/0151690 to Tang et al are hereby each incorporated by reference herein in their entirety.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, tractors, internal housings and substrate portions thereof, and self-propelled tractors.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

An information processing device may include a processor, resident memory, and peripherals for executing programmed instructions. In some embodiments, estimation of the parameter of interest may involve applying a model. The model may include, but is not limited to, (i) a mathematical equation, (ii) an algorithm, (iii) a database of associated parameters, (iv) an array, or a combination thereof which describes physical characteristics of the downhole cuttings in relation to information received by the sensors described herein.

As used herein, the term "fluid" and "fluids" refers to one or more gasses, one or more liquids, and mixtures thereof. High-incidence as used herein may mean relating to an orientation of formation elements such that the angle between the reflecting fracture and the borehole axis is greater than 60 degrees. A "downhole fluid" as used herein includes any gas, liquid, flowable solid and other materials having a fluid property, and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, oils and solvents used in conjunction with downhole tools, water, brine, and combinations thereof.

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method of evaluating an earth formation intersected by a borehole, comprising:
    detecting a reflective boundary in the earth formation by:
        generating a multipole acoustic signal with a logging tool in the borehole;
        identifying a shear wave signal resulting from shear body waves reflected from the reflective boundary in the formation in a near-field region of the formation around the borehole responsive to the generated multipole acoustic signal; and
        estimating at least a depth along the borehole of the boundary based on the shear wave signal.

2. The method of claim 1 wherein the boundary has an angle of incidence with respect to a longitudinal axis of the borehole of greater than 70 degrees.

3. The method of claim 1 wherein the boundary is at least one of i) a fracture; and ii) a fault.

4. The method of claim 1 comprising evaluating the boundary using at least one attribute of the shear wave signal and the estimated depth.

5. The method of claim 1 comprising generating shear waves in the near-field region using a cross-dipole transmitter.

6. The method of claim 1 wherein the logging tool is conveyed on a drill string, the method comprising detecting the reflective boundary during drilling operations.

7. The method of claim 6 further comprising controlling the direction of drilling based on the estimated depth of the boundary.

8. The method of claim 1 comprising conducting one of the following based on the estimated depth of the boundary: i) performing further operations in the formation; ii) generating a formation fracture model.

9. The method of claim 1 wherein the borehole is cased at the depth of the detected boundary.

10. The method of claim 1 wherein the borehole is open at the depth of the detected boundary.

11. The method of claim 1 further comprising estimating at least one property of the boundary using an attribute of the shear wave signal.

12. The method of claim 1 further comprising estimating at least one property of the boundary using another signal resulting from at least one of i) a compressional wave; ii) a Stoneley wave; and iii) a guided wave.

13. The method of claim 12 further comprising estimating at least one property by comparing the another signal with the signal.

14. The method of claim 1 comprising using additional data and the depth to estimate at least one of: i) a location and an orientation of the boundary; and ii) a strike azimuth of the boundary.

15. The method of claim 1 further comprising estimating at least one further property of the boundary using the estimated strike azimuth of the boundary, wherein the at least one further property comprises at least one of: i) a geomechanical property, and ii) a lithological property.

16. A method of evaluating an earth formation comprising:
    performing initial monitoring of the earth formation for reflective boundaries using the method of claim 1;
    after the initial monitoring, performing a hydraulic fracturing operation in the borehole;
    after performing the hydraulic fracturing operation in the borehole, performing additional monitoring of the earth formation for reflective boundaries using the method of claim 1; and
    evaluating the hydraulic fracturing operation in dependence upon differences between results of the initial monitoring and results of the additional monitoring.

17. An apparatus for evaluating an earth formation intersected by a borehole, comprising:

an acoustic tool configured for conveyance in the borehole on a carrier, the acoustic tool including at least one multipole acoustic transmitter and at least one multipole acoustic receiver; and at least one processor configured to detect a reflective boundary in the earth formation by:

generating a multipole acoustic signal with the acoustic tool in the borehole;

identifying a shear wave signal received by the acoustic receiver resulting from shear body waves reflected from the reflective boundary in the formation in a near-field region of the formation around the borehole responsive to the generated multipole acoustic signal; and estimating at least a depth along the borehole of the boundary based on the shear wave signal.

18. The apparatus of claim 17 wherein the at least one processor is configured to detect the reflective boundary when the boundary has an angle of incidence with respect to a longitudinal axis of the borehole of greater than 70 degrees.

19. The apparatus of claim 17 wherein the boundary is at least one of i) a fracture; and ii) a fault.

\* \* \* \* \*